United States Patent [19]
Hellstern

[11] Patent Number: 6,167,272
[45] Date of Patent: Dec. 26, 2000

[54] TEST TRANSMITTER, METHOD AND COMPUTER FOR TESTING A CELLULAR MOBILE RADIO NETWORK

[75] Inventor: Günter Hellstern, Karlsruhe, Germany

[73] Assignee: Alcatel, Paris, France

[21] Appl. No.: 08/977,788

[22] Filed: Nov. 25, 1997

[30] Foreign Application Priority Data

Nov. 25, 1996 [DE] Germany .......................... 196 48 543

[51] Int. Cl.⁷ .................................................. H04Q 7/20
[52] U.S. Cl. ........................ 455/446; 455/67.4; 455/424; 455/447
[58] Field of Search .................... 455/446, 67.4, 455/423, 424, 447, 454, 449

[56] References Cited

U.S. PATENT DOCUMENTS

| | | | |
|---|---|---|---|
| 4,128,740 | 12/1978 | Graziano | 455/447 |
| 4,144,496 | 3/1979 | Cunningham et al. | 455/447 |
| 5,014,342 | 5/1991 | Pudsey | 455/447 |
| 5,111,534 | 5/1992 | Benner | 455/447 |
| 5,218,618 | 6/1993 | Sagey | 455/446 |
| 5,402,413 | 3/1995 | Dixon | 455/447 |
| 5,475,870 | 12/1995 | Weaver, Jr. et al. | 455/446 |
| 5,483,666 | 1/1996 | Yamada et al. | 455/454 |
| 5,561,839 | 10/1996 | Osterberg et al. | 455/446 |
| 5,768,689 | 6/1998 | Borg | 455/67.4 |
| 5,787,350 | 7/1998 | Van Der Vorm et al. | 455/446 |
| 5,946,612 | 8/1999 | Johansson | 455/449 |

FOREIGN PATENT DOCUMENTS

| | | |
|---|---|---|
| 0431956 | 6/1991 | European Pat. Off. . |
| 0696151 | 2/1996 | European Pat. Off. . |
| 4434552 | 4/1996 | Germany . |
| 9429971 | 12/1994 | WIPO . |

*Primary Examiner*—Nay Maung
*Assistant Examiner*—Quochien Vuong
*Attorney, Agent, or Firm*—Milton Oliver; Ware, Fressola, Van Der Sluys & Adolphson LLP

[57] ABSTRACT

It is known to introduce into a cellular mobile radio network (CN) a test transmitter (TS) which transmits a test signal for reception by mobile stations located in the coverage area of the mobile radio network. A simple, computer-aided method for testing the mobile radio network is disclosed in which the test transmitter (TS) transmits the test signal on a carrier already assigned to a base station (BTS) of the mobile radio network (CN) for transmitting broadcast signals. Thus, each mobile station can receive the test signal in a simple manner. The receive level is transmitted to the base station serving the area in which the mobile station is located, and then passed on to a computer for analysis. The computer uses a handoff procedure to analyze the receive level of the test signal and the receive levels of the broadcast signals, and then, based on the results, indicates whether the location of the test transmitter (TS) is suitable for installing a new base station to provide additional radio resources in the mobile radio network.

12 Claims, 4 Drawing Sheets

160 — Report all receive levels Lx and L1 to L5 to the serving base station SBS.

170 — Receive signal levels from N mobile stations. Analyze the receive levels with computer PC:
Preset desired level Lmin.
Set counter k=0.

*Repeat N times*

171 — Compare receive levels for each mobile station:
a) If Lx > L1 to L5
   Lx >> Lmin : Increment counter: k = k+1
b) If not :                    k = k

172 — Evaluate test location :
a) If k > N/2 :     store test location, goto END.
b) If not :         other test location, goto 110.

END

Fig. 3b

TEST TRANSMITTER, METHOD AND COMPUTER FOR TESTING A CELLULAR MOBILE RADIO NETWORK

BACKGROUND OF THE INVENTION

1. Technical Field

This invention relates to a test transmitter for a cellular mobile radio network as set forth in the preamble of claim 1 and to a method and a computer for testing a cellular mobile radio network as set forth in the preambles of the respective independent claims.

2. Discussion of Related Art

From a product information sheet of Motorola, Swindon, United Kingdom, entitled "Digital Cellular Traffic Hotspot Detector", a test transmitter ("beacon") for a cellular mobile radio network, namely for the network based on the GSM standard (GSM: Global System for Mobile Communications), is known. This test transmitter continuously transmits a "dummy BCCH" signal, i.e., a test signal for reception by mobile stations which are located in the coverage area of the mobile radio network. In the computer-aided "hotspot detection" process described there, the test transmitter is established at a test location in the coverage area of the mobile radio network; then, a test signal is transmitted by the test transmitter and received by the mobile stations located in the coverage area of the mobile radio network. Each of the mobile stations which receives the test signal measures the receive level of this signal and reports it to the base station currently serving the cell. A computer connected to this base station analyzes the receive levels reported by several mobile stations in order to determine whether the test location is suitable for installing a base station. The test location is considered suitable if the majority of mobile stations identifies the test signal as being stronger than the broadcast signal being transmitted by the serving base station. The test signal is not present on the so-called neighbor list of the cellular radio network, so that the mobile stations will not identify the test signal as a broadcast signal typical of the mobile radio network and will not attempt to hand over to the test transmitter. Accordingly, the test signal is transmitted arbitrarily on an unassigned carrier. To be able to receive the test signal on this carrier, however, a mobile station must know this carrier and lock its receiver onto this carrier.

SUMMARY OF INVENTION

The object of the invention is to improve the above-mentioned test transmitter and the corresponding method in such a way as to ensure better reception of the test signal by the mobile stations. In addition, a computer is to be provided with the aid of which the method can be carried out in a simple manner.

According to a first aspect of the invention, a test transmitter for a cellular mobile radio network which transmits a test signal for reception by mobile stations located in the coverage area of the mobile radio network is characterized in that the test transmitter transmits the test signal on a carrier already assigned to a base station of the mobile radio network for transmitting broadcast signals to the mobile stations.

According to a second aspect of the invention, a method for testing a cellular mobile radio network wherein a test transmitter is established at a test location in the coverage area of the mobile radio network and wherein a test signal is transmitted by the test transmitter for reception by mobile stations located in the coverage area, is characterized in that to transmit the test signal, use is made of a carrier already assigned to a base station of the mobile radio network for transmitting broadcast signals to the mobile stations.

According to a third aspect of the invention, a computer for testing a cellular mobile radio network, said computer analyzing the receive levels of a test signal and the other receive levels of broadcast signals in order to evaluate the test location of a test transmitter transmitting the test signal, is characterized in that the computer analyzes the receive levels of the test signal and the other receive levels by using them as input data for a handoff process and by checking whether the majority of the mobile stations are to be handed off from their serving base station to the test transmitter and then indicating that the test location should be changed if the majority of the mobile stations are to be handed off.

Accordingly, the test transmitter transmits the test signal on a carrier already assigned to a base station of the mobile radio network for transmitting broadcast signals to the mobile stations. Thus, a carrier is used which is already registered in the mobile radio network. The mobile stations, which are generally ready to receive the broadcast signals, know this carrier and thus can receive the test signal in a simple manner, i.e., without switching to another carrier.

Preferably, in a cellular mobile radio network using different carrier frequencies, this carrier is the carrier frequency being used by one of the base stations for transmitting its broadcast signals, the latter being received at the location of the test transmitter as weakly as possible. Particularly advantageously, the carrier is a carrier frequency on which no broadcast signal is currently being transmitted.

BRIEF DESCRIPTION OF THE DRAWING

The invention will become more apparent from the following description of an embodiment when taken in conjunction with the accompanying drawings, in which:

FIG. 1b shows a part of FIG. 1a;

FIGS. 3a and 3b show the flowchart of a method for testing the cellular mobile radio network, according to the present invention.

DETAILED DESCRIPTION OF PREFERRED EMBODIMENTS

Figure 1A:
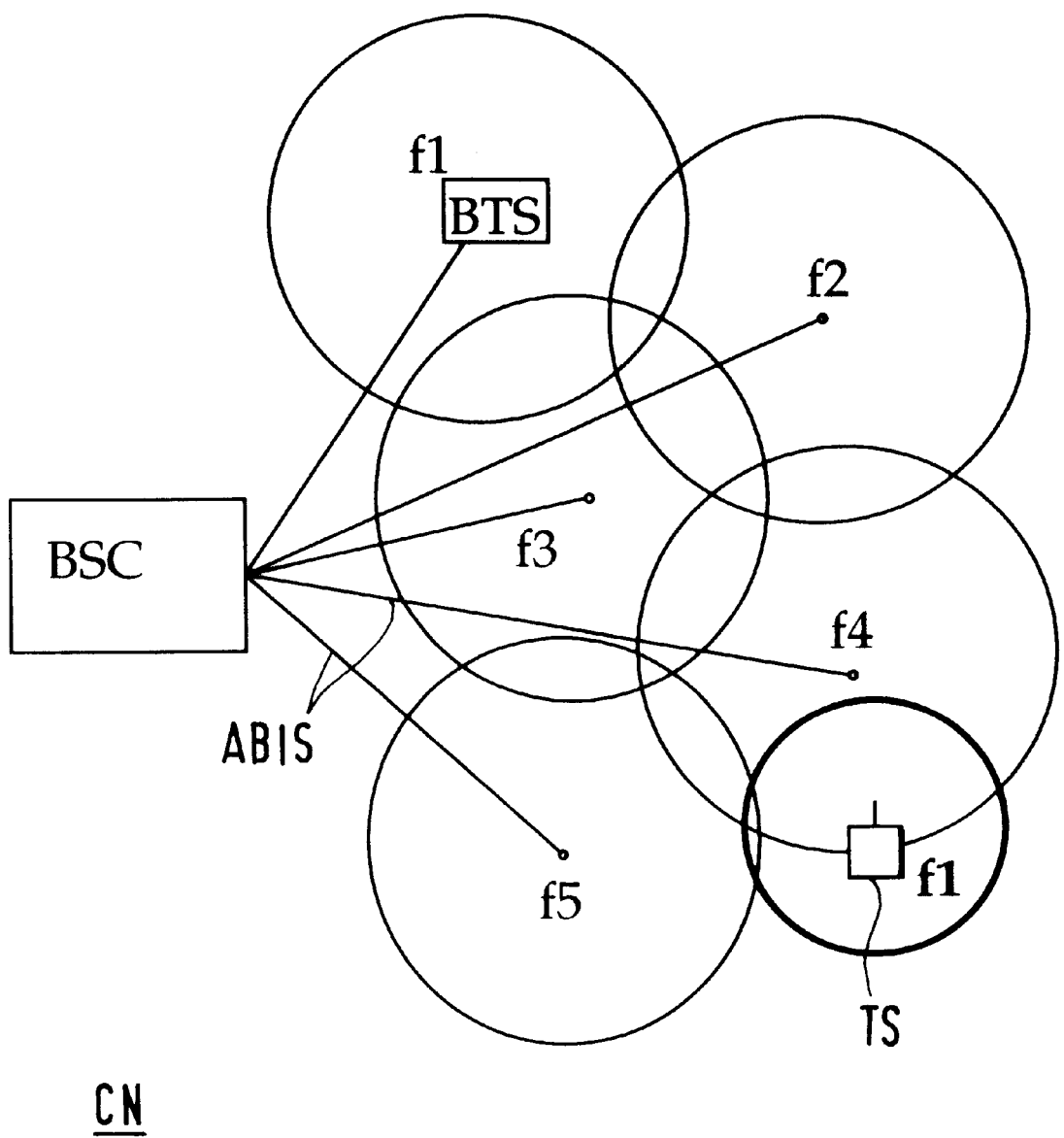
FIG. 1a shows schematically the structure of a cellular mobile radio network, according to the present invention.

FIG. 1a shows schematically the structure of a cellular mobile radio network CN. The mobile radio network CN contains a base station controller BSC, which is connected to base stations via links ABIS. Each of the base stations serves one cell, with adjacent base stations transmitting and receiving radio signals on different carrier frequencies f1 to f5. FIG. 1a shows a group of five adjacent base stations which transmit broadcast signals on the carrier frequencies f1 to f5 to mobile stations located in the cells. These groups of base stations form a so-called cluster, i.e., a part of the coverage area of the mobile radio network in which each of the carrier frequencies f1 to f5 is used only once. In the following, such a group will also be referred to as a cell group. As shown in FIG. 1a, the coverage area of the mobile radio network CN contains a test transmitter TS, which was established at a test location. The test transmitter TS transmits a test signal to the mobile stations on a carrier f1 which corresponds to one of the carrier frequencies f1 to f5. Here, the carrier chosen for the test signal is the carrier frequency f1, which was assigned to the base station BTS for transmitting its broadcast signals. To avoid interferences between the test transmitter TS and this base station BTS, the test signal is transmitted only when this base station BTS is not transmitting its broadcast signals. The test transmitter TS is advantageously located at a great distance from this base station BTS within the cell group.

Figure 1B:
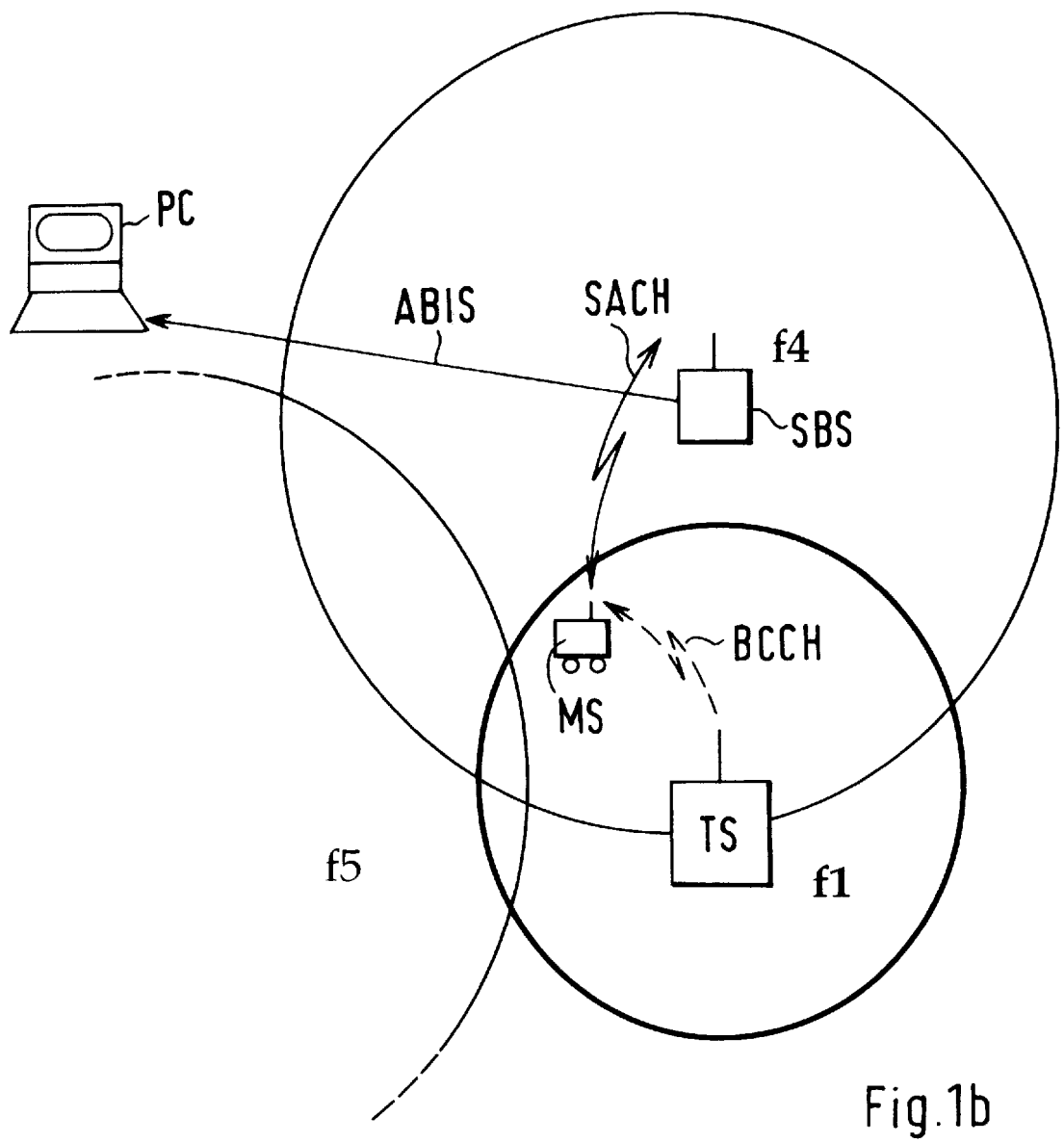

FIG. 1b shows a section of the cellular mobile radio network which comprises the cells with the carrier frequencies f4 and f5 as well as the test location of the test transmitter TS. One mobile station MS of a number N of mobile stations is shown by way of example. In the following, the transmission of the test signal BCCH to this mobile station MS, the reception of the test signal, and the transmission to a computer PC for analysis are described.

The mobile station MS is in the coverage area of its call, i.e., in the area served by the base station SBS, henceforth also called the serving base station. The mobile station MS is also covered by the test transmitter TS. The test transmitter transmits the test transmitter BCCH on the carrier frequency f1. The mobile station MS, which is ready to receive broadcast signals in the mobile radio network, continuously monitors the carrier frequencies f1 to f5 used in the mobile radio network. Thus, the mobile station MS receives the test signal BCCH like the broadcast signals from the neighboring base stations. The mobile station MS can receive the test signal BCCH automatically without any measures having to be taken in the mobile station.

The mobile station MS receives the test signal as well as the broadcast signals from the neighboring base stations and measures all receive levels, which it transmits to the serving base station SBS for analysis by the computer PC. The transmission of the receive levels to the serving base station SBS takes place via the air interface in a control channel SACH, and the subsequent transmission to the computer PC takes place via the link ABIS. In this embodiment, the computer is a workstation connected to the base station controller shown in FIG. 1a but could be any kind of computer. The method of testing using the test signal BCCH will now be described in more detail with reference to FIGS. 2 and 3.

Figure 2:
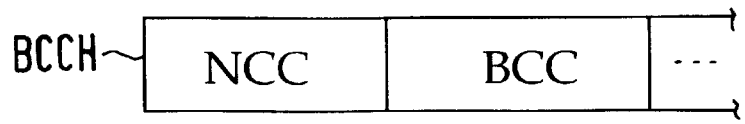
FIG. 2 shows schematically the format of the test signal, according to the present invention.

FIG. 2 shows schematically the format of the test signal BCCH. In this example, the test signal is a digital radio signal with a first identification code NCC and a second identification code BCC. The first identification code NCC corresponds to a code which is specified for all broadcast signals transmitted in the mobile radio network. By this code, the test signal BCCH is identified by the mobile station as a broadcast signal typically transmitted in the mobile radio network. In this example, the mobile radio network is based on the GSM standard, and the first identification code corresponds to the so-called network color code. The second identification code BCC corresponds to a code not yet assigned to a base station in the mobile radio network. The test signal BCCH is thus given the character of a broadcast signal which appears to be coming from an "unknown" base station. By the first identification code NCC, a mobile station receiving the test signal BCCH identifies this test signal as a broadcast signal typical of the mobile radio network, whose receive level is to be measured. The second identification code BCC serves to indicate to the computer PC that this receive level does not belong to a "normal" broadcast signal being transmitted by a base station registered in the mobile radio network but originates from an unregistered base station, namely the test transmitter TS. This receive level can then be compared in the computer PC with the receive levels associated with "normal" broadcast signals from base stations. The method 100 for testing the mobile radio network will now be described in detail with reference to FIGS. 3a and 3b.

Figure 3A:
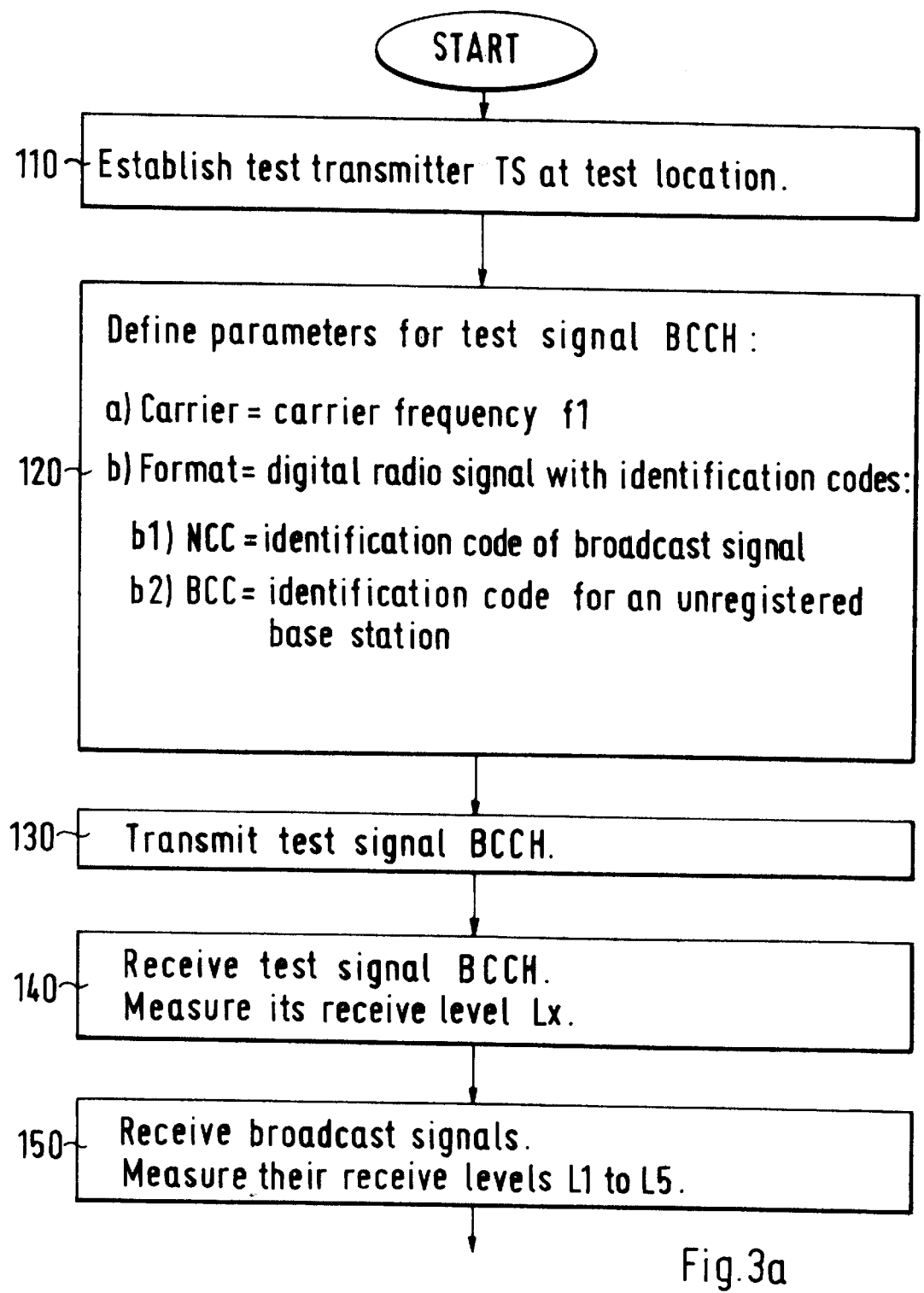

As shown in FIG. 3a, in a first step 110, the test transmitter TS is established at a test location within the coverage area of the mobile radio network. In a second step 120, the parameters for the test signal BCCH to be transmitted are defined as follows: (a) The carrier for the test signal is the carrier frequency f1; (b) the format of the test signal corresponds to that of a digital radio signal with the identification codes NCC and BCC.

In a further step 130, the test signal BCCH is transmitted by the test transmitter TS. In step 140, the test signal is received by a mobile station and the receive level Lx is measured. In a further step 150, the mobile station receives broadcast signals from the other base stations and measures their receive levels L1 to L5. In a subsequent step 160, the mobile station reports all measured receive levels Lx and L1 to L5 to the serving base station SBS. The receive levels are transmitted to the base station SBS by radio over the control channel SACH, and the base station SBS retransmits them over the link ABIS to the computer PC. In a next step 170, the computer analyzes the receive levels by (a) comparing the receive levels Lx with the other receive levels L1 to L5 and (b) evaluating the test location.

To evaluate the test location, a sequence of steps 170, comprising steps 171 and 172, is taken. This sequence of steps corresponds to a computing procedure whose actual purpose is to control handoff of mobile stations by the base station controllers and mobile switching centers of the mobile radio network. This computing procedure, also referred to herein as the handoff process, is used to evaluate the test location. For each of the N mobile stations, the receive levels Lx and L1 to L5 are used as input data for the handoff process.

In the first step 171 of the sequence of steps 170, these six receive levels Lx and L1 to L5 are compared with a presettable desired level $L_{min}$. If the receive level Lx of the test signal is greater than the other receive level L1 to L5 and substantially greater than the desired level $L_{min}$, a counter k will be incremented by one: k=k+1. The incrementation of the counter k signifies that this mobile station has received the test signal as the best signal. Step 171 is repeated for the next of the N mobile stations, i.e., until N times six receive levels have been analyzed.

In the second step 172 of the sequence of steps 170, it is determined whether the count of the counter k is greater than half the number of all N mobile stations, i.e., whether the majority of mobile stations (k>N/2) is receiving the test signal so well that these k mobile stations are to be handed off to the supposed base station, namely to the test transmitter. If that is the case, the test location is considered suitable for the installation of a "normal" base station. The test location is stored in a memory. The method is then ended. If the majority of the N mobile stations are not to be handed off, another test location will be selected and evaluated. The method will then be repeated from step 110.

As described above, a handoff procedure is used to evaluate the test location of the test transmitter. The suitability of the test location is determined on the basis of handoff criteria so as to achieve as realistic an evaluation as possible. A test location will then be preferred over others if as many mobile stations as possible "desire" a normal base station there. Since a handoff procedure can take into account many decision parameters, such as the stability of the receive levels within a predeterminable time interval, the evaluation of the test location can be readily refined. In addition, the use of an existing handoff procedure saves the developing costs of a software tool for evaluating the test location.

In the above example, the test transmitter and the method were described in reference to a cellular mobile radio network using different carrier frequencies. In that example, the carrier for the test signal corresponds to a particular carrier frequency. The carrier may also be a TDMA time slot (TDMA: Time Division Multiple Access). In a CDMA (Code Division Multiple Access) mobile radio network, in which different spreading codes are chosen, a particular spreading code may be used as the carrier for the test signal. In the above example, the receive level of the test signal is measured and compared with other receive levels for analysis. It is also possible to measure and compare other parameters of the test signal, such as the bit error rate.

What is claimed is:

1. A test transmitter (TS) for a cellular mobile radio network (CN) which transmits a test signal (BCCH) for reception by mobile stations (MS) located in the coverage area of the mobile radio network, wherein the test transmitter (TS) transmits the test signal (BCCH) on a carrier frequency (f1) already assigned to a base station (BTS) of the mobile radio network (CN) for transmitting broadcast signals to the mobile stations (MS), and the test signal includes a first code distinguishing the mobile radio network from other mobile radio networks and a second code indicating a base station not yet registered in the mobile radio network.

2. A test transmitter (TS) as claimed in claim 1, characterized in that the coverage area of the cellular mobile radio network (CN) comprises cells with different carrier frequencies, and that the carrier on which the test transmitter (TS) transmits the test signal (BCCH) is a carrier frequency (f1) assigned to said base station (BTS) for transmitting the broadcast signals.

3. A test transmitter as claimed in claim 1, characterized in that the cellular mobile radio network is a digital mobile radio network whose coverage area comprises cells with different spreading codes, and that the carrier on which the test transmitter transmits the test signal is a spreading code assigned to said base station for transmitting the broadcast signals.

4. A test transmitter (TS) as claimed in claim 1, characterized in that the coverage area of the cellular mobile radio network (CN) is divided into groups of cells, and that the test transmitter (TS) transmits the test signal (BCCH) from a test location within one of the groups of cells on the carrier (f1) assigned to that base station (BTS) within the group of cells whose broadcast signals have a low receive level (L1) at said test location.

5. A test transmitter (TS) as claimed in claim 4, characterized in that the test transmitter (TS) transmits the test signal (BCCH) on the carrier (f1) assigned to that base station (BTS) from which the test transmitter (TS) is spaced the greatest distance within said group of cells.

6. A test transmitter (TS) as claimed in claim 1, characterized in that the broadcast signals are digital radio signals with a predeterminable format, and that the test signal (BCCH) transmitted by the test-transmitter (TS) is a digital radio signal with said format.

7. A test transmitter (TS) for a cellular mobile radio network (CN) which transmits a test signal (BCCH) for reception by mobile stations (MS) located in the coverage area of the mobile radio network, wherein the coverage area of the cellular mobile radio network (CN) is divided into groups of cells, the test transmitter (TS) transmits the test signal (BCCH) from a test location within one of the groups of cells on the carrier frequency (f1) assigned to that base station (BTS), within the group of cells, whose broadcast signals have a low receive level (L1) at said test location, and the test transmitter transmits the test signal (BCCH) on the carrier frequency (f1) assigned to that base station (BTS) which does not transmit its broadcast signals during the transmission of the test signal.

8. A method (100) of testing a cellular mobile radio network (CN) having a plurality of base stations, comprising the steps of setting up a test transmitter at a test location in a coverage area of the mobile radio network, transmitting a test signal (BCCH) from the test transmitter (TS) for reception by mobile stations (MS) located in the coverage area, said test signal including a code designating said test transmitter as a base station not yet registered in the network, using a carrier frequency (f1) already assigned to a base station (BTS) of the mobile radio network (CN) for transmitting broadcast signals to mobile stations (MS), and evaluating in a computer how reception quality of said test signal by said mobile stations compares with reception quality of signals received by said mobile stations from said base stations.

9. A method (100) as claimed in claim 8, characterized in that the receive level (Lx) of the test signal (BCCH) is measured by the mobile stations (MS) (step 140), that the broadcast signals of the base stations are received by the mobile stations (MS) and their receive levels (L1 to L5) are measured (step 150), and that all measured receive levels (Lx, L1 to L5) are transmitted from the mobile stations (MS) to the serving base station (SBS) (step 160) for analysis in a computer (PC) (step 170).

10. A method (100) as claimed in claim 9, characterized in that by means of the computer (PC), the receive levels (Lx) of the test signal are compared with the other receive levels (L1 to L5), and that the test location will be changed if the receive level (Lx) of the test signal is less than the other receive levels (L1 to L5).

11. A method (100) as claimed in claim 9, characterized in that by means of the computer (PC), the receive levels (Lx) of the test signal and the other receive levels (L1 to L5) are analyzed by being used as input data for a handoff process to determine whether the majority of the mobile stations (MS) are to be handed off from their serving base station (SBS) to the test transmitter (TS), and that the test location will be changed if the majority of the mobile stations (MS) are to be handed off.

12. A method (100) as claimed in claim 11, characterized in that as additional input data for the handoff process, the lengths of those time intervals are used which indicate how long each of the input levels (Lx, L1 to L5) does not drop below a presettable level ($L_{min}$).

* * * * *

UNITED STATES PATENT AND TRADEMARK OFFICE
CERTIFICATE OF CORRECTION

PATENT NO. : 6,167,272
DATED : August 1, 2000
INVENTOR(S) : Hellstern

It is certified that error appears in the above-identified patent and that said Letters Patent is hereby corrected as shown below:

Column 5,
Claim 6, line 4, "test-transmitter" should be --test transmitter--.

Column 6,
Claim 9, lines 3, 6, 9 and 10, "[step . . .] should be deleted.
Claim 11, line 10 "changed" should be --considered suitable--.

Signed and Sealed this

Tenth Day of July, 2001

*Attest:*

*Nicholas P. Godici*

*Attesting Officer*

NICHOLAS P. GODICI
*Acting Director of the United States Patent and Trademark Office*